(12) United States Patent
Tchakerian et al.

(10) Patent No.: US 9,779,460 B2
(45) Date of Patent: Oct. 3, 2017

(54) SYSTEMS, METHODS AND NON-TRANSITORY COMPUTER READABLE STORAGE MEDIA FOR TRACKING AND EVALUATING PREDICTIONS REGARDING RELATIONSHIPS

(71) Applicants: Marineh Tchakerian, Encinitas, CA (US); Shant Hagop Tchakerian, Encinitas, CA (US)

(72) Inventors: Marineh Tchakerian, Encinitas, CA (US); Shant Hagop Tchakerian, Encinitas, CA (US)

( * ) Notice: Subject to any disclaimer, the term of this patent is extended or adjusted under 35 U.S.C. 154(b) by 678 days.

(21) Appl. No.: 14/182,588

(22) Filed: Feb. 18, 2014

(65) Prior Publication Data
US 2015/0235129 A1 Aug. 20, 2015

(51) Int. Cl.
*G06F 17/00* (2006.01)
*G06N 5/02* (2006.01)
*G06Q 50/00* (2012.01)
*G06Q 10/00* (2012.01)

(52) U.S. Cl.
CPC ............ *G06Q 50/01* (2013.01); *G06Q 10/00* (2013.01)

(58) Field of Classification Search
CPC ......... G06R 17/30766; G06F 17/30861; G06F 17/30867; G06F 17/30303; G06F 17/30545; G06F 17/00; G06Q 10/10; G06Q 30/00; G06Q 50/01; G06N 5/04; G06N 7/005; G06N 5/02
USPC .......................................................... 706/50
See application file for complete search history.

(56) References Cited

U.S. PATENT DOCUMENTS

| | | | | |
|---|---|---|---|---|
| 6,766,329 B1* | 7/2004 | Nicholson | .......... | G06F 17/30882 |
| 6,909,971 B2* | 6/2005 | Toivonen | ................ | G06F 19/24 |
| | | | | 435/6.11 |
| 7,912,842 B1* | 3/2011 | Bayliss | ............. | G06F 17/30303 |
| | | | | 707/749 |
| 8,239,499 B2* | 8/2012 | Kwon | ................... | G06Q 10/00 |
| | | | | 705/14.1 |

(Continued)

OTHER PUBLICATIONS

'Unemployment and marital dissolution': Jensen, Journal of Population Economics' 1990 3:215-229.*

*Primary Examiner* — Stanley K Hill
*Assistant Examiner* — Peter Coughlan
(74) *Attorney, Agent, or Firm* — Shant Tchakerian

(57) ABSTRACT

Methods, non-transitory computer-readable storage media, and computer systems comprising at least one non-transitory computer-readable storage medium and at least one processor are provided for evaluating predictions regarding relationships. A computer system is controlled to manage a relationships database of relationship data records. Each relationship data record includes a person identifier for each person in the relationship. The computer system is controlled to manage a prediction database of prediction data records. Each prediction data record includes a relationship prediction for a relationship identified by a relationship data record in the relationships database. For each relationship prediction included in a prediction data record in the prediction database, the computer system is controlled to determine whether the relationship prediction is correct by accessing official records from a database via a network, and generate a prediction result indicator that indicates a result of the determination.

20 Claims, 7 Drawing Sheets

(56) References Cited

U.S. PATENT DOCUMENTS

| | | | |
|---|---|---|---|
| 9,122,759 B2* | 9/2015 | Carter | G06F 17/30861 |
| 2011/0208681 A1* | 8/2011 | Kuecuekyan | G06N 99/005 |
| | | | 706/21 |
| 2012/0264521 A1* | 10/2012 | Wells | A63F 13/85 |
| | | | 3/85 |
| 2013/0090979 A1* | 4/2013 | Tuck | G06Q 30/02 |
| | | | 705/7.29 |

* cited by examiner

Relationship Data Record 201

| Relationship ID 202 | Relationship Attributes 203 | Marriage Probability Index 204 | Person ID 205 | Person ID 206 |

FIGURE 2

Prediction Data Record 400

| Prediction ID 401 | Marriage Prediction 402 | Predictor ID 403 | Prediction Credit Attribute 404 |

FIGURE 4

Marriage Prediction 402

| Relationship ID 501 | Deadline 502 | Outcome 503 |

FIGURE 5

SYSTEMS, METHODS AND NON-TRANSITORY COMPUTER READABLE STORAGE MEDIA FOR TRACKING AND EVALUATING PREDICTIONS REGARDING RELATIONSHIPS

FIELD

The present disclosure relates to tracking and evaluating predictions regarding a relationship.

BACKGROUND

There is often uncertainty about the future of a relationship between two or more people. For example, an unmarried couple might decide to get married, continue dating, or break up. A married couple might decide to divorce or separate. A couple, either married or unmarried, might choose to have children.

SUMMARY

Methods, non-transitory computer-readable storage media, and computer systems comprising at least one non-transitory computer-readable storage medium and at least one processor are provided for evaluating predictions regarding relationships.

In an example embodiment, a computer system is controlled to manage a relationships database of relationship data records. Each relationship data record includes a person identifier for each person in the relationship. The computer system is controlled to manage a prediction database of prediction data records. Each prediction data record includes a relationship prediction for a relationship identified by a relationship data record in the relationships database. For each relationship prediction included in a prediction data record in the prediction database, the computer system is controlled to determine whether the relationship prediction is correct by accessing official records from a database via a network, and generate a prediction result indicator that indicates a result of the determination.

By virtue of the foregoing, predictions regarding relationships can be tracked and evaluated.

According to an aspect, each prediction data record includes a predictor identifier identifying a person who made the prediction, and in a case where a relationship prediction identified by a prediction data record in the prediction database is determined to be correct, the computer system is controlled to notify the person identified by the corresponding predictor identifier that the prediction is correct.

According to an aspect, the prediction result indicator is stored in the prediction database in association with the corresponding prediction data record.

According to an aspect, the relationship data records include relationship data records for unmarried people. A relationship prediction corresponding to a relationship data record for unmarried people is a prediction regarding whether or not the people identified in the relationship data record will marry, and the relationship prediction is evaluated by determining whether or not the people identified in the relationship data record are married according to the official records. According to an aspect, the official records include official marriage records. According to an aspect, each relationship prediction for unmarried people indicates a marriage deadline, a relationship identifier which identifies the corresponding relationship data record, and an outcome that indicates whether or not the people identified in the relationship data record identified by the relationship identifier are predicted to marry before the deadline.

According to an aspect, the computer system is controlled to assign a marriage probability index to each relationship data record for unmarried people, the marriage probability index indicating a likelihood that the people identified in the relationship data record will marry. According to an aspect, the marriage probability index is generated by performing an analysis of the corresponding relationship data record. According to an aspect, the marriage probability index is generated by performing big data analytics on the corresponding relationship data record and personal data collected for each person identified in the relationship data record.

According to an aspect, the relationship data records include relationship data records for married people. A relationship prediction corresponding to a relationship data record for married people is a prediction regarding whether or not the people identified in the relationship data record will end the marriage, and the relationship prediction is evaluated by determining whether or not the people identified in the relationship data record are married according to the official records. According to an aspect, the official records include at least one of official marriage records, official divorce records, and official separation records. According to an aspect, each relationship prediction for married people indicates a marriage termination deadline, a relationship identifier which identifies the corresponding relationship data record, and an outcome that indicates whether or not the people identified in the relationship data record identified by the relationship identifier are predicted to end the marriage before the deadline.

According to an aspect, the computer system is controlled to assign a divorce probability index to each relationship data record for married people, the divorce probability index indicating a likelihood that the people identified in the relationship data record will end the marriage. According to an aspect, the divorce probability index is generated by performing an analysis of the corresponding relationship data record. According to an aspect, the divorce probability index is generated by performing big data analytics on the corresponding relationship data record and personal data collected for each person identified in the relationship data record.

According to an aspect, the prediction data records include at least one prediction data record that includes a relationship prediction regarding future children of the people identified in the corresponding relationship data record, the official records include official birth records, and the relationship prediction regarding future children is evaluated by determining whether or not at least one person identified in the relationship data record is indicated as being a parent of a person included in the birth records. According to an aspect, each relationship prediction regarding future children indicates a children deadline, a relationship identifier which identifies the corresponding relationship data record, and an outcome that indicates at least one of 1) whether or not the people identified in the relationship data record identified by the relationship identifier are predicted to have at least one child before the deadline, 2) whether or not the people identified in the relationship data record identified by the relationship identifier are predicted to have a predicted number of children before the deadline, 3) whether or not the people identified in the relationship data record identified by the relationship identifier are predicted to have at least one child of a particular gender before the deadline. According to an aspect, each relationship prediction regarding future children indicates a relationship identifier which identifies the corresponding relationship data record, and an outcome that indicates the predicted gender of the next child of the people identified in the relationship data record identified by the relationship identifier.

According to an aspect, the computer system is controlled to assign a children probability index to each relationship data record in the relationships database, the children probability index indicating a likelihood that the people identified in the relationship data record will have a child. According to an aspect, the children probability index is generated by performing an analysis of the corresponding relationship data record. According to an aspect, the children probability index is generated by performing big data analytics on the corresponding relationship data record and personal data collected for each person identified in the relationship data record.

According to an aspect, the computer system generates the relationship data by performing big data analytics on publicly available personal data.

According to an aspect, the computer system provides access to at least one of the relationships database and the prediction database. According to an aspect, the computer system provides access to at least one of the relationships database and the prediction database in exchange for at least one of a system credit and money.

By virtue of accessing the prediction database, a person in a relationship can view predictions related to their relationship and learn about the health of their relationship based on these predictions. By virtue of accessing the relationships database, predictors can make more informed predictions. By virtue of accessing the relationships database or the prediction database, advertisers can make more informed advertising decisions.

According to an aspect, each relationship data record is associated with relationship attributes including at least one of a relationship status, a number of children associated with the relationship, information identifying children associated with the relationship, a date of a last relationship status change, a previous relationship status, and user-provided relationship information.

According to an aspect, each person identifier is associated with person attributes including at least one of age, sex, sexual orientation, ethnicity, occupation, education, location, net worth, political affiliation, fitness level, attractiveness, purchase data, media consumption data, web browsing data, tax filing data, social network data, calendar data, e-mail data, Twitter data, geo-location data, travel history, photo data, medical data, criminal record data, DNA data, user-provided personal information and employment data.

According to an aspect, the computer system is controlled to receive a user identifier identifying a person providing at least one of user-provided relationship information associated with a relationship data record, and user-provided personal information associated with a person identifier included in the relationships database, and the computer system is controlled to provide the person identified by the user identifier with a system credit. According to an aspect, the system credit is a monetary credit.

According to an aspect, each prediction data record includes at least one of 1) a prediction credit attribute indicating a number of prediction credits provided by a person identified by a predictor identifier associated with a relationship prediction included in the prediction database, 2) a prediction value used to compute a number of prediction credits provided to a predictor associated with the relationship prediction in a case where the marriage prediction is evaluated to be correct, and 3) a prediction time indicating a time at which the prediction data record was generated.

According to an aspect, the computer system is controlled to receive a number of system credits provided by a person identified by a predictor identifier associated with a relationship prediction included in the prediction database. The computer system is controlled to provide the person with a number of system credits that is proportional to the number of system credits received from the person for the relationship prediction in a case where the relationship prediction is evaluated to be correct. According to an aspect, the system credit is a monetary credit.

According to an aspect, the number of system credits provided to the person in the case where the relationship prediction is evaluated to be correct is computed based on a prediction value associated with the relationship prediction. According to an aspect, the prediction value is determined during at least one of 1) generation of the corresponding prediction data record, 2) evaluation of the relationship prediction, and 3) at a predetermined time.

According to an aspect, the number of system credits provided to the person in the case where the relationship prediction is evaluated to be correct is computed based on at least one of a marriage probability index, a divorce probability index and a children probability index assigned to the relationship prediction.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 2 is a view of a relationship data record according to an example embodiment.

FIG. 4 is a view of a prediction data record according to an example embodiment.

FIG. 5 is a view of a relationship prediction according to an example embodiment.

DETAILED DESCRIPTION

Overview

The present disclosure provides Methods, non-transitory computer-readable storage media, and computer systems comprising at least one non-transitory computer-readable storage medium and at least one processor for evaluating predictions regarding relationships.

In an example embodiment, a computer system is controlled to manage a relationships database of relationship data records. Each relationship data record includes a person identifier for each person in the relationship. The computer system is controlled to manage a prediction database of prediction data records. Each prediction data record includes a relationship prediction for a relationship identified by a relationship data record in the relationships database. For each relationship prediction included in a prediction data record in the prediction database, the computer system is controlled to determine whether the relationship prediction is correct by accessing official records from a database via a network, and generate a prediction result indicator that indicates a result of the determination.

First Embodiment

In the first example embodiment to be described below, the relationship data records include relationship data records for unmarried people. A relationship prediction corresponding to a relationship data record for unmarried people is a prediction regarding whether or not the people identified in the relationship data record will marry, and the relationship prediction is evaluated by determining whether or not the people identified in the relationship data record are married according to the official records. The official records include official marriage records. Each relationship prediction for unmarried people indicates a marriage deadline, a relationship identifier which identifies the corresponding relationship data record, and an outcome that indicates whether or not the people identified in the relationship data record identified by the relationship identifier are predicted to marry before the deadline.

In the first embodiment, a marriage probability index is assigned to each relationship data record for unmarried people, the marriage probability index indicating a likelihood that the people identified in the relationship data record will marry.

Computer System

Figure 1:
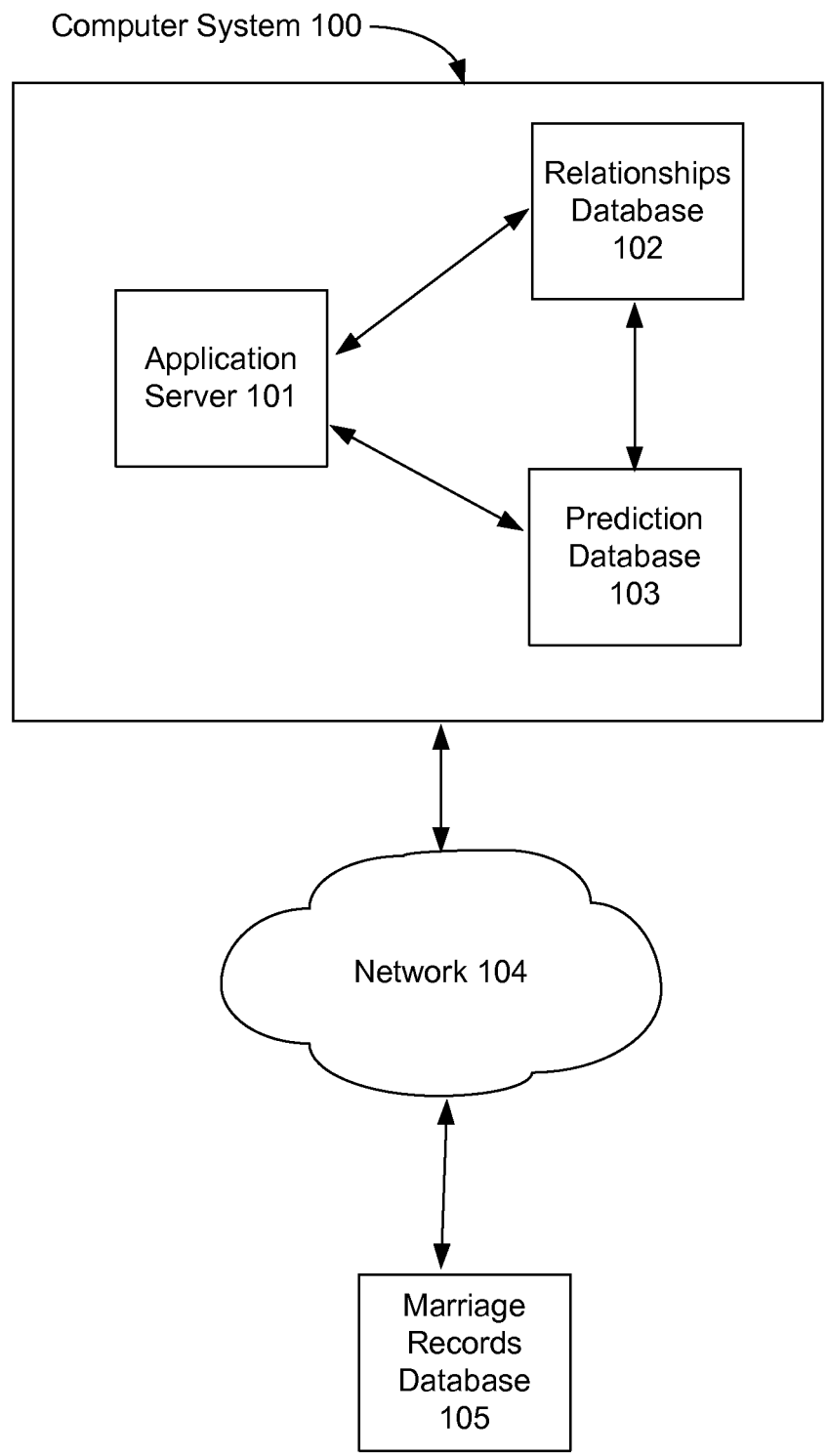
FIG. 1 is a view of a computer system according to an example embodiment.

FIG. 1 is a view of a computer system 100 according to the example embodiment. The computer system 100 includes an application server 101, a relationships database 102, and a prediction database 103. In the example embodiment, the computer system 100 is a computing device running one or more applications, including the application server 101 application, the relationships database 102 application, and the prediction database 103 application. The computer system 100 is communicatively coupled to a network 104. In the example embodiment, the computer system 100 is communicatively coupled to a marriage records database 105 via the network 104.

In other embodiments, the application server, the relationships database, the prediction database, and the marriage records database can be distributed among any number of computing devices.

Relationships Database

In the example embodiment, the relationships database 102 generates relationship data records automatically by accessing any combination of public or private information available via the network 104 to determine names of people in a relationship about to become married. For example, the relationships database 102 can access wedding registry information from a wedding registry database (not shown) via the network 104 to determine names of people in a relationship about to become married. Such wedding registry databases can include, for example, wedding registry databases provided by wedding web sites, such as, for example, theknot.com, weddingchannel.com, and the like. Such wedding registry databases can also include, for example, wedding registry databases provided by shopping web sites, such as, for example, amazon.com, macys.com, bloomingdales.com, bedbathandbeyond.com, and the like. The relationships database 102 can also access wedding announcement information from a wedding announcement database (not shown) via the network 104 to determine names of people in a relationship about to become married. Such wedding announcement databases can include, for example, wedding announcement databases provided by news web sites and tabloid web sites, such as, for example, nytimes.com, abovethelaw.com, tmz.com, and the like. For example, the relationships database 102 can access wedding venue calendar information from a wedding venue calendar database (not shown) via the network 104 to determine names of people in a relationship about to become married. Such wedding venue calendar databases can include, for example, wedding venue calendar databases provided by wedding venue web sites, such as, for example, fourseasons.com, and the like. For example, the relationships database 102 can access wedding photography information from a wedding photography web site (not shown) via the network 104 to determine names of people in a relationship about to become married. For example, the relationships database 102 can access personal relationship status information from a social media web site via the network 104 to determine names of people in a relationship about to become married. Such social media web sites can include, for example, facebook.com, instagram.com, twitter.com, and the like.

By analyzing the above-described information that has been accessed via the network 104, the computer system 100 identifies people in a relationship, assigns a person identifier for each person, generates a relationship identifier for the relationship, and associates the relationship identifier with each person identifier. This information is stored in the relationships database 102 as a relationship data record.

In the example embodiment, each relationship data record stored in the relationships database 102 includes a relationship identifier, a person identifier for each person in the relationship. Each relationship data record also includes relationship attributes for the relationship, and a marriage probability index. The marriage probability index indicates a likelihood that the couple will marry. In other embodiments, relationship data records do not include a marriage probability index. The relationship attributes and the marriage probability index will be described in more detail below.

FIG. 2 is a view of an exemplary relationship data record. As shown in FIG. 2, relationship data record 201 includes relationship identifier 202, relationship attributes 203, marriage probability index 204, person identifier 205 and person identifier 206. Each person identifier links to a corresponding person data record that includes person attributes. In relationship data record 201, the relationship is between two people, and therefore only two people are identified. However, in a relationship data record for a relationship between more than two people, the relationship data record will include a person identifier for each person.

In the example embodiment, the relationships database 102 also receives information identifying a relationship via a user-interface, and the computer system 100 uses this information to generate a relationship data record.

Figure 3:
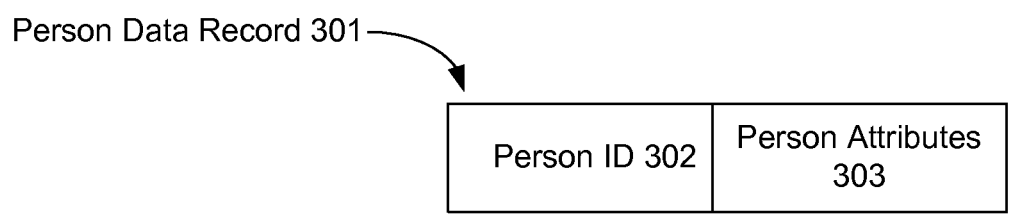
FIG. 3 is a view of a person data record according to an example embodiment.

FIG. 3 is a view of an exemplary person data record. As shown in FIG. 3, person data record 301 includes person identifier 302 and person attributes 303. In the example embodiment, each person data record is stored in the relationships database 102, but in other embodiments, person data records can be stored in a database separate from the relationships database 102.

In the example embodiment, relationship attributes include any number of attributes. Relationship attributes can include, for example, a relationship status (e.g., "dating", "married", "separated", or "divorced"), a number of children associated with the relationship, information identifying children associated with the relationship, a date of a last relationship status change, the previous relationship status, user-provided relationship information, and any other attribute that provides information about the relationship.

In the example embodiment, person attributes include any number of attributes. Person attributes can include, for example, age, sex, sexual orientation, ethnicity, occupation, education, location, net worth, political affiliation, fitness level, attractiveness, a person's purchase data (e.g., from credit cards, customer loyalty cards, and the like), media consumption data (e.g., TV viewing data, Internet media streaming data, iTunes media data), web browsing data, tax filing data, social network data, calendar data, e-mail data, Twitter data, geo-location data, travel history, photo data, medical data, criminal record data, DNA data, user-provided personal information, employment data, any other attribute that provides information about a person.

In the example embodiment, user-provided relationship information and user-provided person information can be provided by any person, including a person in the relationship and the person described by the user-provided person information.

In the example embodiment, the computer system 100 generates relationship attributes and person attributes automatically by collecting any combination of public or private information available via the network 104. In the example embodiment, the computer system 100 applies big data analytics to the data collected via the network 104 to generate additional relationship attributes and additional person attributes. Big data analytics is a term for analytics performed on a collection of data sets so large and complex that it becomes difficult to process using on-hand database management tools or traditional data processing applications.

In the example embodiment, the relationships database 102 also receives relationship information and person information via a user-interface, and the computer system 100 uses this information to generate relationship attributes and person attributes. As will be described below, people providing such information receive a system credit, according to the example embodiment.

Marriage Probability Index

Reverting back to the discussion of the marriage probability index, in the example embodiment, the computer system 100 (of FIG. 1) generates a marriage probability index for a respective relationship data record by performing an analysis of the corresponding relationship attributes for the relationship data record and the person attributes for each person identified by a person ID associated with the relationship data record. In the example embodiment, these relationship attributes and person attributes of the relationship data record ("the subject relationship data record") are compared with corresponding attributes of other relationship data records that have been included in evaluated marriage predictions ("evaluated relationship data records"). The actual marriage outcomes (married or not by the deadline) of evaluated relationship data records having relationship attributes and person attributes similar to those attributes of the subject relationship data record are used to determine the marriage probability index for the subject relationship data record. For example, if similar evaluated relationship data records had actual marriage outcomes in which marriage resulted before the marriage deadline, then the marriage probability index for the subject relationship data record would indicate a higher likelihood that the people identified in the subject relationship data record will many. In other words, if similar relationships result in marriage, then the marriage probability index would indicate a higher likelihood that the subject relationship would result in marriage. The computer system continuously updates the marriage probability index for the subject relationship data record as marriage predictions are evaluated.

In other embodiments, the marriage probability index is generated for a relationship by performing big data analytics on one or more of the corresponding relationship attributes and the person attributes and personal data collected for each person corresponding to the relationship. In other embodiments, the marriage probability index is generated from a computer system different from computer system 100, and the marriage probability index is provided to computer system 100.

Providing System Credits for Information Disclosure

The example embodiment involves providing incentives for people to provide information describing people and relationships included in the relationships database 102. As described above, the computer system 100 uses this information to generate relationship attributes and person attributes. The computer system provides people who provide such disclosures with system credits.

In the example embodiment, the system credits are provided based on at least one of the quality of information provided, the quantity of information provided, demand for the type of information provided, demand for information about the particular person, demand for information about the particular relationship, a negotiated amount, a predetermined amount. In other embodiments, the number of system credits provided can be determined in any suitable manner.

In other embodiments, the computer system does not provide system credits to people who provide information describing people and relationships included in the relationships database.

System Credits

In the example embodiment, the computer system 100 operates using system credits. The computer system 100 provides system credits to users of the computer system 100 who provide information describing people and relationships included in the relationships database 102. The computer system 100 also provides system credits to users of the computer system 100 whose predictions are determined to be correct.

The computer system 100 receives system credits in exchange for information and services provided by the computer system. For example, a user can redeem system credits for access to the relationships database 102 and the prediction database 103, and a user can redeem system credits to enter a relationship prediction into the computer system 100.

In the example embodiment, each system credit is a monetary credit that has a monetary value, and the computer system 100 buys system credits in exchange for money, and sells system credits in exchange for money. In the example embodiment, the computer system 100 facilitates exchange of system credits among users of the computer system 100.

In the example embodiment, system credits are transferrable outside of the computer system 100. For example, a user of the computer system 100 can transfer system credits to a non-user of the computer system 100.

In the example embodiment, a system credit is linkable to a particular disclosure of information to the computer system 100, such that the information is only accessible from the computer system 100 in exchange for the system credit that is linked to that information.

For example, a user of the computer system 100 who discloses information to the computer system 100 can choose to have this information linked to the system credit that the user receives. In this example, only the user can access the disclosed information. If this user chooses to share the information with another user, the user transfers the linked system credit to the other user (possibly for a fee, or in exchange for another system credit), and the other user can then redeem the system credit for the linked information. In this manner, access to information can be controlled.

In other embodiments, a system credit is not linkable to a particular disclosure of information to the computer system.

In other embodiments, the computer system does not buy system credits in exchange for money, and it does not sell system credits in exchange for money. In other embodiments, the computer system does not buy system credits in exchange for money. In other embodiments, the computer system does not sell system credits in exchange for money. In other embodiments, the computer system does not facilitate exchange of system credits among users of the computer system.

Prediction Database

Reverting to FIG. 1, in the example embodiment, the prediction database 103 stores prediction data records. Each prediction data record includes a marriage prediction for a relationship identified by a relationship data record in the relationships database, and a predictor identifier identifying a person who made the prediction. In the example embodiment, each prediction data record also includes a prediction credit attribute. The prediction credit attribute indicates a number of system credits provided by a person identified by the predictor identifier. In other embodiments, the prediction data records do not include a prediction credit attribute. In the example embodiment, each prediction data record also includes a prediction identifier. In other embodiments, the prediction data records do not include a prediction identifier.

FIG. 4 is a view of an exemplary prediction data record 400, which includes a prediction identifier 401, a marriage prediction 402, a predictor identifier 403, and a prediction credit attribute 404.

In other embodiments, each prediction data record can include one or more of 1) a prediction credit attribute 2) a prediction value used to compute a number of prediction credits provided to a predictor associated with the marriage prediction in a case where the marriage prediction is evaluated to be correct, and 3) a prediction time indicating a time at which the prediction data record was generated.

In the example embodiment, each marriage prediction indicates a marriage deadline, a relationship identifier which identifies the corresponding relationship data record, and an outcome that indicates whether or not the people identified in the relationship data record identified by the relationship identifier are predicted to marry before the deadline.

FIG. 5 is a view of exemplary marriage prediction 402 of FIG. 4. As shown in FIG. 5, marriage prediction 402 includes a relationship identifier 501, a deadline 502, and an outcome 503.

User Interface for Selecting Relationships

As described above, in the example embodiment, each relationship data record stored in the relationships database 102 includes a relationship identifier, a person identifier for each person in the relationship, relationship attributes for the relationship, and a marriage probability index. In the example embodiment, the application server 101 (of FIG. 1) provides a user interface (UI). In the example embodiment, the user interface is a graphical user interface. However, in other embodiments, the user interface can be any suitable type of user interface, such as, for example, a textual user interface, an audio user interface (e.g., a user interface involving audible output and speech recognition input), and the like.

In the example embodiment, the user interface displays visual representations of relationships identified by relationship data records in the relationships database 102, and receives instructions for user-selection of a visual representation corresponding to a designated relationship.

Searching for Relationships

In the example embodiment, the user interface is constructed to receive user instructions for searching for relationships included in the relationships database 102, and display visual representations of relationships based a search performed in accordance with the received instructions for searching. In the example embodiment, the search is a natural language search. In other embodiments, the search can be any other suitable type of search, such as, for example, a keyword search, a query-based search, and the like. In the example embodiment, the application server 101 performs the search by identifying at least one relationship included in the relationships database 102 that matches the received search instructions, as determined by one or more of the relationship attributes for the relationship, person attributes of people in the relationship, and the marriage probability index for the relationship.

Browsing Relationships in the Relationships Database

In the example embodiment, the user interface is also constructed to receive user instructions for browsing relationships included in the relationships database 102, and displaying visual representations of relationships based on the received user instructions for browsing.

With respect to browsing, in the example embodiment, the application server 101 controls the user interface to display visual representations of categories defining subsets of the relationships included in the relationships database 102, and in response to reception of a user instruction for user-selection of a visual representation of a category, the application server 101 controls the user interface to display at least a portion of all relationships included in the selected category. A relationship is determined to be included in a category based on at least one of the relationship attributes for the relationship, person attributes of people in the relationship, and the marriage probability index of each relationship. In the example embodiment, a category can be a single attribute, the marriage probability index, a grouping of attributes, a grouping of the marriage probability index and at least one attribute, and a category defined by an analysis of one or more of the attributes and the marriage probability index.

For example, categories can be based on relationship status (e.g., "dating", "married", "separated", or "divorced"), number of children associated with the relationship, information identifying children associated with the relationship, date of a last relationship status change, previous relationship status, user-provided relationship information, age, sex, sexual orientation, ethnicity, occupation, education, location, net worth, political affiliation, fitness level, attractiveness, a person's purchase data (e.g., from credit cards, customer loyalty cards, and the like), media consumption data (e.g., TV viewing data, Internet media streaming data, iTunes media data), web browsing data, tax filing data, social network data, calendar data, e-mail data, Twitter data, geo-location data, travel history, photo data, medical data, criminal record data, DNA data, user-provided personal information, employment data, and the like.

Receiving Predictions

In the example embodiment, the user interface is constructed to receive a user instruction for user-selection of a displayed visual representation of a relationship. In response to reception of a user instruction for user-selection of a displayed visual representation of a relationship, the application server 101 provides a user interface for receiving a marriage prediction for the selected relationship.

In the example embodiment, the user interface for receiving the marriage prediction for the selected relationship is constructed to receive user instructions for a marriage deadline and an outcome that indicates whether or not the people identified in the selected relationship are predicted to many before the deadline. The user interface for receiving the marriage prediction for the selected relationship is also constructed to receive user instructions for reception of a system credit. In the example embodiment, the system credit is a form of wager on the outcome of the marriage prediction. In some embodiments, the system credit is used to keep scores on the outcome of the marriage prediction.

Generating Prediction Data Records

In the example embodiment, in response to reception of user instructions for the marriage deadline, the outcome, and reception of the instructions for reception of the system credit, the application server 101 controls the prediction database 103 to store a prediction data record based on the received user instructions for the marriage deadline, the outcome, and reception of the prediction credit. More precisely, the application server 101 generates a marriage prediction that includes a relationship identifier for the selected relationship, a deadline corresponding to the instructions for the marriage deadline, and an outcome corresponding to the instructions for the outcome. The application server 101 also generates a prediction credit attribute corresponding to the user instructions for the reception of the system credit.

In the example embodiment, in response to reception of the instructions for reception of the system credit, the application server 101 retrieves the system credit from a user account specified in the instruction, in an amount specified in the instruction. After retrieval of the system credit, the application server 101 sets the prediction credit attribute to the amount specified in the system credit instruction. In other embodiments, the application server 101 acquires the system credit in any suitable manner.

In other embodiments, in response to reception of the instructions for reception of the system credit, rather than retrieve the system credit, the application server 101 includes the instructions for reception of the system credit in the prediction credit attribute, for later retrieval of the system credit.

The application server 101 obtains an identifier that identifies the user entering the prediction. In the example embodiment, the identifier is received via the user interface for receiving the marriage prediction for the selected relationship. In other embodiments, the identifier can be an identifier previously obtained, such as, for example, an identifier obtained during a user authentication process in which the application server 101 authenticates the user.

The application server 101 generates a prediction identifier that identifies the prediction data record that is to be generated.

The application server 101 generates a prediction data record that includes the generated prediction identifier, the generated marriage prediction, the generated prediction credit attribute, and the obtained identifier that identifies the user entering the prediction. The application server 101 controls the prediction database 103 to store the prediction data record.

Displaying Information about Relationships

As described above, the application server 101 provides a user interface for receiving a user instruction for user-selection of a displayed visual representation of a relationship. In response to reception of a user instruction for user-selection of a displayed visual representation of a relationship, the application server 101 provides a user interface for displaying information about the selected relationship.

In the example embodiment, the user interface displays a portion of information for the selected relationship that is stored in the relationships database 102, and displays additional information for the selected relationship in exchange for one or more system credits. Specifically, the user interface displays at least one visual representation corresponding to additional information that is available in exchange for one or more system credits. In response to user-selection of a visual representation corresponding to additional information, the application server 101 provides a user interface constructed to receive user instructions for reception of the system credit. In response to reception of the system credit, the application server 101 provides a user interface display of the selected additional information.

In other embodiments, all information is displayed, regardless of reception of a system credit. In other embodiments, no information is displayed without reception of a system credit.

Processing Requests for Information about Relationships

In the example embodiment, the user interface for displaying information about the selected relationship is constructed to receive a user instruction for a request for additional information about the selected relationship, the additional information being information not presently available from the relationships database 102. The user interface is constructed to receive an offered system credit for the requested information.

In the example embodiment, in response to receiving a request for additional information about the selected relationship, the computer system 101 provides a notification to each person in the relationship identifying the information requested, and a system credit to be provided to the person disclosing the requested information. In the example embodiment, the system credit offered by the user requesting information is more than the system credit offered to the person disclosing the requested information, and the difference between the system credit offered by the user and the system credit offered to the person disclosing the requested information is retained by an operator of the computer system 101.

Receiving Information about Relationships

As described above, the application server 101 provides a user interface for receiving a user instruction for user-selection of a displayed visual representation of a relationship. In response to reception of a user instruction for user-selection of a displayed visual representation of a relationship, the application server 101 provides a user interface for receiving information about the selected relationship.

In the example embodiment, the information about the selected relationship is received via a text input. In other embodiments, the information about the selected relationship is received via any suitable type of input. Information about the relationship includes information related to the relationship attributes, information related to attributes of people in the relationship, a narrative describing the relationship, a report of news related to the relationship, and any other type of information about related to the relationship.

In the example embodiment, the user interface for receiving information about the selected relationship is constructed to receive an information credit amount. The information credit amount indicates a system credit amount that is to be provided to the user disclosing the information. In the example embodiment, the information credit amount indicates a system credit amount that is to be provided to the user for disclosure of the information to all users of the system. In other embodiments, the user interface for receiving information about the selected relationship is constructed to receive an information credit amount that is to be provided to the user for disclosure of the information to a user of the system. In other embodiments, the user interface for receiving information about the selected relationship is not constructed to receive an information credit amount. In other embodiments, the user interface for receiving information about the selected relationship is constructed to receive an information credit amount for disclosure of the information to a user of the system and an information credit amount for disclosure of the information to all users of the system.

In the example embodiment, the information credit amount includes one of a numerical amount and a market rate amount. In the example embodiment, the numerical amount can be any numerical amount. In the example embodiment, the market rate amount is an amount dynamically determined by the computer system 100 based on at least one of demand for the type of information provided and demand for the particular information provided.

Evaluating a Prediction

For each marriage prediction included in a prediction data record in the prediction database 103, the application server 101 evaluates the marriage prediction by accessing official marriage records from a database via a network to determine whether the marriage prediction is correct. The application server 101 generates a prediction result indicator that indicates a result of the determination.

In the example embodiment, the application server 101 stores the prediction result indicator in the prediction database in association with the corresponding prediction data record. In the example embodiment, the prediction result indicator is stored in a computer-readable format. In other embodiments, the prediction result indicator can be stored in a human-readable format. In the example embodiment, the prediction result indicator is used to generate a user-perceptible indicator, such as, for example, a visually perceptible indicator that is displayed on a graphical user interface, an audibly perceptible indicator, and the like.

Specifically, in the example embodiment, the marriage prediction is evaluated by determining whether or not the people identified in the relationship data record identified by the relationship identifier are included in the official marriage records accessed via the network. For example, the application server 101 can analyze the marriage records to determine whether the names of the people included in a relationship that is the subject of a marriage prediction are included in the marriage records and identified to be married to each other. The application server 101 determines that a prediction, that the relationship identified by the relationship identifier will many before the deadline, is correct in a case where the names of the people included in the relationship are included in the marriage records. Similarly, the application server 101 determines that a prediction that the relationship identified by the relationship identifier will not many before the deadline is correct in a case where the names of the people included in the relationship are not included in the marriage records.

In the example embodiment, the marriage records include official government marriage records, and the computer system 100 accesses the marriage records from the marriage records database 105 via the network 104.

In the example embodiment, in a case where a marriage prediction identified by a prediction data record in the prediction database 103 is evaluated to be correct, the application server 101 notifies the person identified by the corresponding predictor identifier that the prediction is correct. In the example embodiment, the notification is provided in an electronic message provided by, for example, an e-mail system, a messaging system, a social networking system, an application, a telephony system, or any other suitable type of system capable of providing a user with an electronic notification. In other embodiments, any suitable type of notification can be provided.

In other embodiments, the application server 101 does not notify the person in a case where a marriage prediction identified by a prediction data record in the prediction database 103 is evaluated to be correct.

Providing System Credits for Correct Predictions

Additionally, in the example embodiment, in the case where the marriage prediction is evaluated to be correct, the application server 101 provides a person identified by a predictor identifier associated with the marriage prediction with a number of system credits that is proportional to the number of system credits indicated by the corresponding prediction credit attribute. The number of system credits provided to the person is computed based on a prediction value associated with the relationship prediction.

In the example embodiment, the prediction value is determined during evaluation of the marriage prediction. Specifically, the application server 101 determines the total number of system credits provided for other predictions that are opposite the marriage prediction being evaluated. For example, if a person predicts that a couple will many in two years, an opposite prediction could be, for example, a prediction that the couple will not marry in two years. The application server 101 also determines the total number of system credits provided by all users for the marriage prediction being evaluated. After determining the total number of system credits provided for opposite predictions and the total number of system credits provided by all users for the marriage prediction being evaluated, the application server 101 determines the prediction value as shown in Equation 1:

$$\text{Prediction Value} = [\text{system credits indicated by prediction credit attribute}] + \{([\text{system credits indicated by prediction credit attribute}]/[\text{total number of system credits provided by all users for the marriage prediction being evaluated}]) * [\text{total number of system credits provided for opposite predictions}]\}$$

In other embodiments, the prediction value is determined during at least one of 1) generation of the corresponding prediction data record, 2) evaluation of the marriage prediction, and 3) at a predetermined time.

In other embodiments, the number of system credits provided to the person is computed based on the associated marriage probability index.

In other embodiments, in the case where the marriage prediction is evaluated to be correct, the application server provides a person identified by a predictor identifier associated with the marriage prediction with a number of system credits that is not proportional to the number of system credits indicated by the corresponding prediction credit attribute.

In other embodiments, the number of system credits that the application server provides to the person identified by the predictor identifier associated with the marriage prediction is determined in any suitable manner.

Providing Access to the Relationships Database and the Predication Database

In the example embodiment, the computer system provides access to the relationships database and the prediction database. In the example embodiment, this access is provided in exchange for at least one of a system credit and money. In other embodiments, an exchange of money or system credits is not required for access to the relationships database and the prediction database.

For example, a person can provide system credits to the computer system 100 to obtain access to the prediction database and view marriage predictions provided by others. A person in a relationship that is the subject of at least one prediction in the prediction database can view marriage predictions for their relationship, and learn about the health of their relationship based on the predictions of others. A person whose information is included in the relationships database can see what information has been disclosed about them.

As another example, a person planning to make a prediction can view the information in the relationships database to make a more informed prediction. Such a person can also view predictions in the prediction database to learn what other people are predicting. For example, a person can view predictions in the prediction database to learn what other people are predicting, and then make a prediction that predicts an outcome that is opposite an outcome of a prediction in the prediction database.

As yet another example, advertisers can view information in the relationships database and the prediction database to make more informed advertising decisions. For example, a wedding venue can determine which relationships are likely to marry, and target such relationships in their advertising. Similarly, a retailer that provides wedding registries can determine which relationships are likely to many, and target such relationships in their advertising and provide them with incentives to register with the retailer.

Internal Architecture of the Computer System

Figure 6:
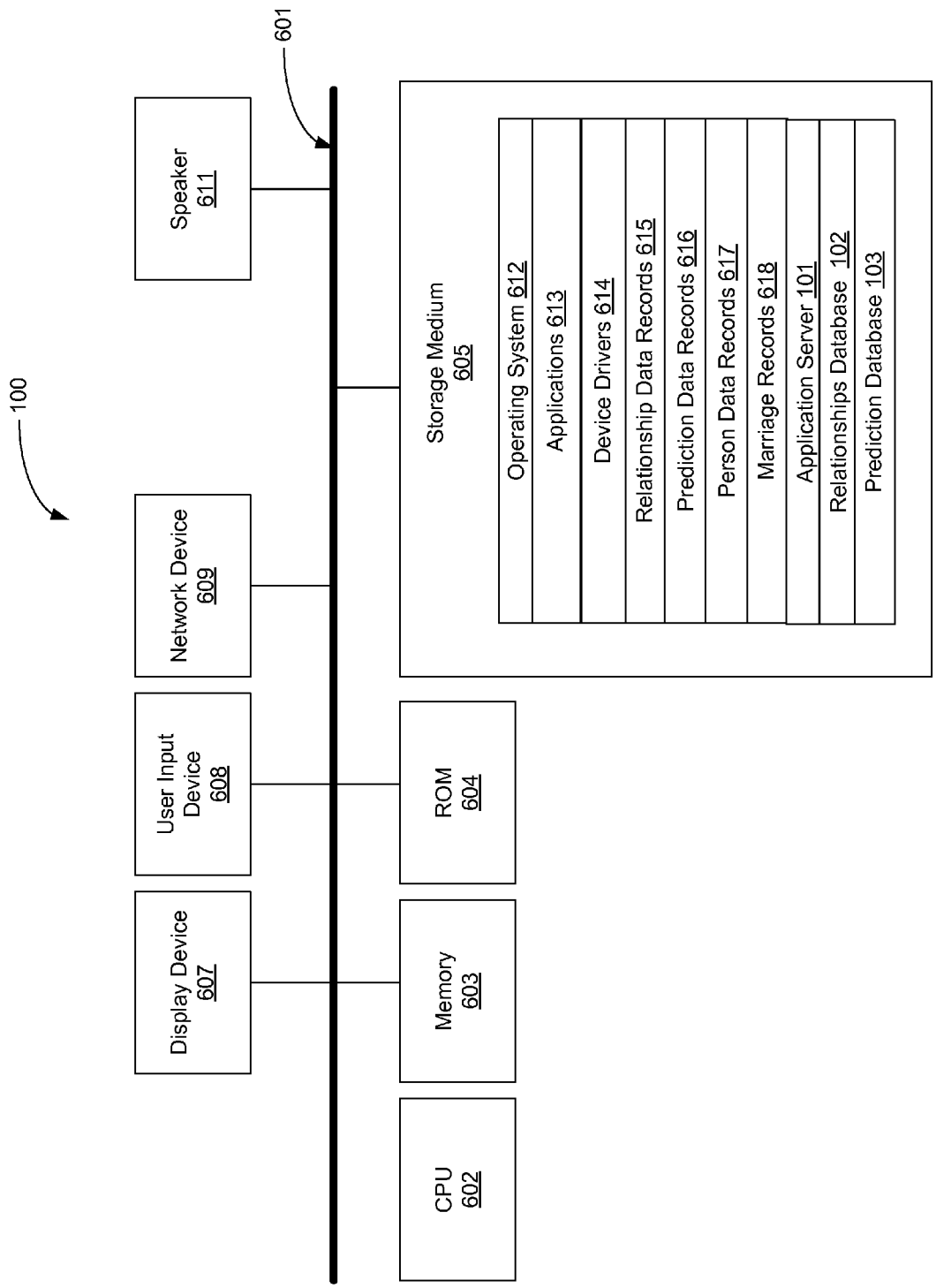
FIG. 6 is a detailed block diagram depicting the internal architecture of the computer system of FIG. 1 according to an example embodiment.

FIG. 6 is a detailed block diagram depicting the internal architecture of the computer system 100 of FIG. 1 according to the example embodiment.

The bus 601 interfaces with a central processing unit (CPU) 602, a random access memory (RAM) 603, a read only memory (ROM) 604, a non-transitory computer-readable storage medium 605, a display device 607, a user input device 608, a network device 609, and a speaker 611.

The network device 609 provides one or more wired or wireless interfaces for exchanging data and commands between the computing system 100 and other devices. Such wired and wireless interfaces include, for example, a Universal Serial Bus (USB) interface, Bluetooth interface, Wi-Fi interface, Ethernet interface, Near Field Communication (NFC) interface, and the like.

Machine-executable instructions in software programs (such as an operating system 612, application programs 613, and device drivers 614) are loaded into the memory 603 from the computer-readable storage medium 605, the ROM 604 or any other storage location. During execution of these software programs, the respective machine-executable instructions are accessed by the CPU 602 via the bus 601, and then executed by the CPU 602. Data used by the software programs are also stored in the memory 603, and such data is accessed by the CPU 602 during execution of the machine-executable instructions of the software programs.

The computer-readable storage medium 605 is a non-transitory computer-readable storage medium, such as, for example, a hard drive, a flash drive, a DVD, a CD, a flash storage, a solid state drive, and the like. The computer-readable storage medium 605 includes an operating system 612, the software programs 613, device drivers 614, the application server 101, the relationships database 102, the prediction database 103, relationships data records 615, prediction data records 616, person data records 617, and marriage records 618.

In the example embodiment, the marriage records 618 are official government marriage records that are retrieved from the marriage records database 105 via the network device 109 and the network 104.

The application server 101, the relationships database 102, and the prediction database 103 are each software modules that include machine-executable instructions that when executed by the CPU 602, control the computer system 100 to track and evaluate predictions regarding relationships. Specifically, the application server 101 manages the relationships database 102. The relationships database 102 includes relationship data records 615, and each relationship data record 615 includes a person identifier for each person in the relationship. The person data records 617 includes person identifiers. The application server 101 also manages the prediction database 103. The prediction database 103 includes prediction data records 616. Each prediction data record 616 includes a relationship prediction for a relationship identified by a relationship data record 615 in the relationships database 102. For each relationship prediction included in a prediction data record 616 in the prediction database 103, the application server 101 determines whether the relationship prediction is correct by accessing official data records from database 105 via network 104, and generates a prediction result indicator that indicates a result of the determination.

In the example embodiment, the relationship data records 615 include relationship data records for unmarried people. A relationship prediction corresponding to a relationship data record 615 for unmarried people is a prediction regarding whether or not the people identified in the relationship data record 615 will marry, and the relationship prediction is evaluated by determining whether or not the people identified in the relationship data record 615 are married according to the official records. In the example embodiment, the official records include official marriage records 618 which have been retrieved from database 105 via network 104. In the example embodiment, each relationship prediction for unmarried people indicates a marriage deadline, a relationship identifier which identifies the corresponding relationship data record 615, and an outcome that indicates whether or not the people identified in the relationship data record 615 identified by the relationship identifier are predicted to marry before the deadline.

In the example embodiment, the application server 101 stores the prediction result indicator in the prediction database 103 in association with the corresponding prediction data record 616.

In the example embodiment, each prediction data record 616 includes a predictor identifier identifying a person who made the prediction, and in a case where a relationship prediction identified by a prediction data record 616 in the prediction database 103 is determined to be correct, the application server 101 notifies the person identified by the corresponding predictor identifier that the prediction is correct.

Flow Diagram for Explaining the Processing Performed by the Computer System

Figure 7:
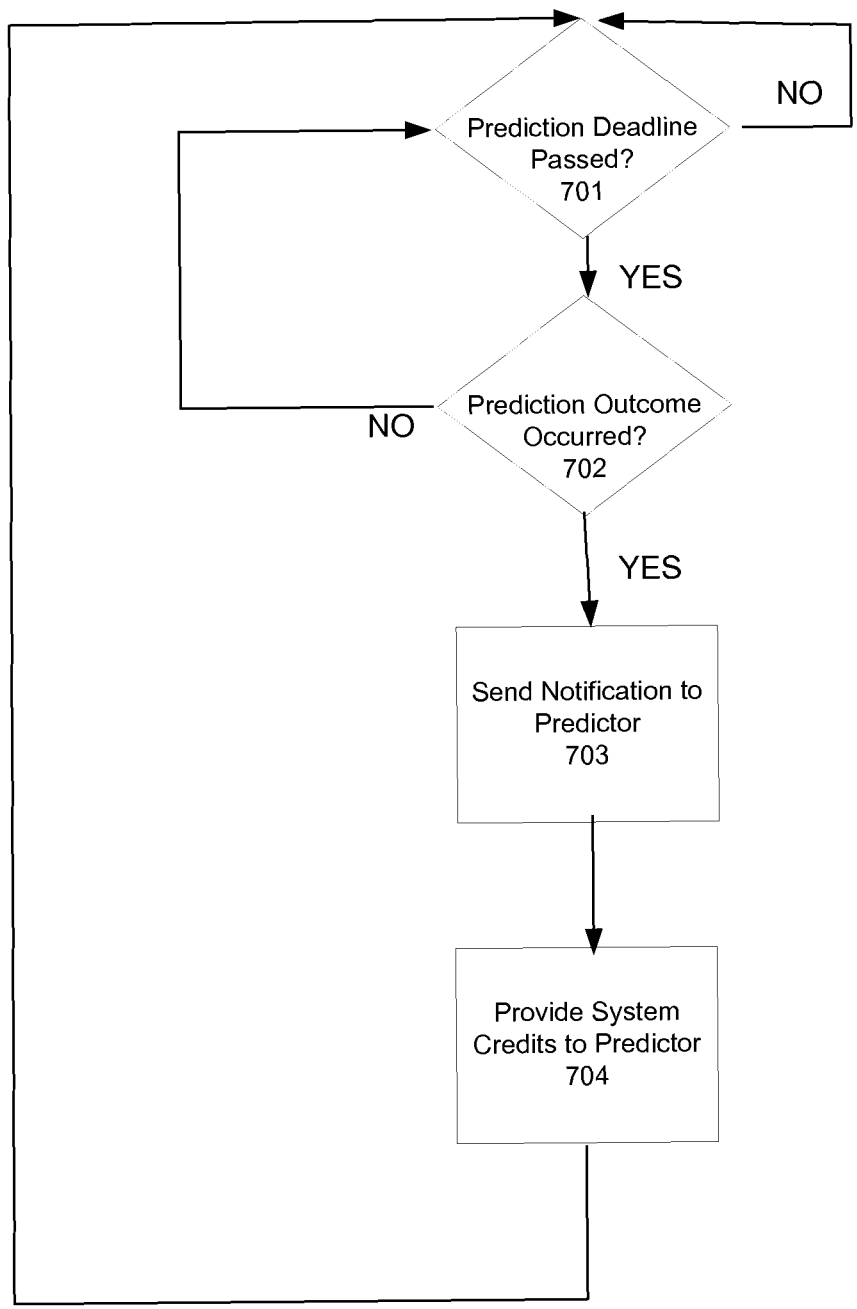
FIG. 7 is a flow diagram for explaining processing performed by the computer system of FIG. 1 according to an example embodiment.

FIG. 7 is a flow diagram for explaining processing performed by the computer system 100 of FIG. 1 to evaluate relationship predictions, according to the example embodiment.

As described above, the prediction database 103 includes prediction data records (616 of FIG. 6), and each prediction data record includes a prediction identifier, a marriage prediction, a predictor identifier, and a prediction credit attribute. Each marriage prediction indicates a marriage deadline, a relationship identifier, and an outcome that indicates whether or not the people identified in the relationship data record identified by the relationship identifier are predicted to many before the deadline.

At 701, the application server 101 determines whether the prediction database 103 contains any prediction data records whose marriage deadline has passed. If the application server 101 determines that the prediction database 103 does not contain any prediction data records whose marriage deadline has passed ("NO" at 701), then processing returns to 701.

If the application server 101 determines that the prediction database 103 contains at least one prediction data record whose marriage deadline has passed ("YES" at 701), then processing proceeds to 702. For the first prediction data record whose marriage deadline has passed, the application server 101 determines whether the predicted outcome (included in the marriage prediction) occurred by determining whether or not the people identified in the relationship data record identified by the relationship identifier are included in the marriage records 618 (of FIG. 6). This process for determining whether the predicted outcome occurred was described previously, in the section entitled "Evaluating a Prediction." The application server 101 generates a prediction result indicator that indicates a result of the determination and stores the prediction result indicator in the prediction database in association with the corresponding prediction data record.

If the application server 101 determines that the predicted outcome (included in the marriage prediction) for the first prediction data record whose marriage deadline has passed did not occur ("NO" at 702), then processing returns to 701 where the application server 101 determines whether there is another prediction data record whose marriage deadline has passed.

If the application server 101 determines that the predicted outcome (included in the marriage prediction) for the first prediction data record whose marriage deadline has passed did occur ("YES" at 702), then processing proceeds to 703 where the application server 101 notifies the person identified by the corresponding predictor identifier that the prediction is correct. Thereafter, processing proceeds to 704.

At 704, the application server 101 provides the person identified by the corresponding predictor identifier with a number of system credits that is proportional to the number of system credits indicated by the corresponding prediction credit attribute, as described above in the section "Providing System Credits for Correct Predictions."

Thereafter processing returns to 701 where the application server 101 determines whether there is another prediction data record whose marriage deadline has passed.

Second Embodiment: Divorce Predictions

The second embodiment is similar to the first embodiment, but differs from the first embodiment as described below.

In the second example embodiment, the relationship data records include relationship data records for married people. A relationship prediction corresponding to a relationship data record for married people is a prediction regarding whether or not the people identified in the relationship data record will end the marriage, and the relationship prediction is evaluated by determining whether or not the people identified in the relationship data record are married according to the official records. The official records include at least one of official marriage records, official divorce records, and official separation records. Each relationship prediction for married people indicates a marriage termination deadline, a relationship identifier which identifies the corresponding relationship data record, and an outcome that indicates whether or not the people identified in the relationship data record identified by the relationship identifier are predicted to end the marriage before the deadline.

A divorce probability index is assigned to each relationship data record for married people, the divorce probability index indicating a likelihood that the people identified in the relationship data record will end the marriage. The divorce probability index is generated by performing an analysis of the corresponding relationship data record.

In other embodiments, the divorce probability index is generated by performing big data analytics on the corresponding relationship data record and personal data collected for each person identified in the relationship data record.

Third Embodiment: Children Predictions

The third embodiment is similar to the first embodiment, but differs from the first embodiment as described below.

In the third example embodiment, the prediction data records include at least one prediction data record that includes a relationship prediction regarding future children of the people identified in the corresponding relationship data record, the official records include official birth records, and the relationship prediction regarding future children is evaluated by determining whether or not at least one person identified in the relationship data record is indicated as being a parent of a person included in the birth records. Each relationship prediction regarding future children indicates a children deadline, a relationship identifier which identifies the corresponding relationship data record, and an outcome that indicates at least one of 1) whether or not the people identified in the relationship data record identified by the relationship identifier are predicted to have at least one child before the deadline, 2) whether or not the people identified in the relationship data record identified by the relationship identifier are predicted to have a predicted number of children before the deadline, 3) whether or not the people identified in the relationship data record identified by the relationship identifier are predicted to have at least one child of a particular gender before the deadline.

In other embodiments, each relationship prediction regarding future children indicates a relationship identifier which identifies the corresponding relationship data record, and an outcome that indicates the predicted gender of the next child of the people identified in the relationship data record identified by the relationship identifier.

A children probability index is assigned to each relationship data record in the relationships database, the children probability index indicating a likelihood that the people identified in the relationship data record will have a child. The children probability index is generated by performing an analysis of the corresponding relationship data record.

In other embodiments, the children probability index is generated by performing big data analytics on the corresponding relationship data record and personal data collected for each person identified in the relationship data record.

CONCLUSION

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method comprising:
  a relationships database automatically generating a relationship data record by accessing wedding registry information from an external wedding registry database system via a network, wherein the relationship data record includes a first person identifier for a first person of a relationship identified from the accessed wedding registry information, and wherein the relationship data record includes a second person identifier for a second person of the relationship;
  an application server computing device generating a first marriage prediction data record and storing the first marriage prediction data record at a prediction database, wherein the first marriage prediction data record includes a relationship identifier of the relationship, a first marriage deadline, a first marriage outcome, and a first user identifier;
  the application server computing device determining whether the first marriage deadline of the first marriage prediction data record has passed;
  responsive to a determination that the first marriage deadline of the first marriage prediction data record has passed, the application server computing device accessing marriage records from a marriage records database system via the network and determining whether the first marriage outcome is correct based on the accessed marriage records,
  responsive to determining that the first marriage outcome is correct, the application server computing device providing a first notification to a system associated with the first user identifier, wherein the first notification indicates whether the first marriage outcome is correct,
  wherein the first marriage outcome indicates whether the first person and the second person are predicted to marry before the first marriage deadline,
  wherein the wedding registry database system is different from the marriage records database system,
  wherein the wedding registry information is different from the marriage records,
  wherein the wedding registry information includes names of people in a relationship about to become married, and
  wherein the first user identifier is associated with a third person that is different from the first person and the second person.

2. The method of claim 1, wherein the application server computing device determines that the first marriage outcome is correct by determining whether the first person and the second person of the relationship identified by the relationship identifier are included in the accessed marriage records and identified as being included in a marriage.

3. The method of claim 1, wherein the prediction database and the relationships database are included in the application server computing device.

4. The method of claim 1, wherein the prediction database and the relationships database are included in at least one database computing device.

5. The method of claim 1, further comprising: responsive to receiving relationship information via the network, the relationships database generating relationship attributes and storing the relationship attributes in the relationship data record.

6. The method of claim 1, further comprising: responsive to receiving first person information via the network, the relationships database generating first person attributes and storing the first person attributes in association with the first person identifier.

7. The method of claim 1, further comprising: responsive to receiving second person information via the network, the relationships database generating second person attributes and storing the second person attributes in association with the second person identifier.

8. The method of claim 1, further comprising:
  responsive to receiving relationship information via the network, the relationships database generating relationship attributes and storing the relationship attributes in the relationship data record;
  responsive to receiving first person information via the network, the relationships database generating first person attributes and storing the first person attributes in association with the first person identifier;
  responsive to receiving second person information via the network, the relationships database generating second person attributes and storing the second person attributes in association with the second person identifier; and
  the relationships database generating a first marriage probability index by performing an analysis of first person attributes, second person attributes, and relationship attributes, and storing the first marriage probability index in the relationship data record.

9. The method of claim 8, further comprising: responsive to a user instruction, the application server computing device providing a user interface for displaying information of the relationship data record.

10. The method of claim 9, further comprising: the application server computing device providing information of the prediction database to an external system.

11. The method of claim 1, wherein the application server computing device generates the first marriage prediction data record responsive to reception of first user selection of the relationship and reception of instructions for the first marriage deadline and the first marriage outcome via a user interface provided by the application server computing device.

12. A hardware system comprising:
  at least one processor; and
  at least one storage medium storing machine-executable instructions of an application server and a relationships database, wherein the at least one processor is constructed to execute the machine-executable instructions of the application server and the relationships database, and wherein the machine-executable instructions comprise instructions for controlling the computer system to:

automatically generate a relationship data record by accessing wedding registry information from an external wedding registry database system via a network, wherein the relationship data record includes a first person identifier for a first person of a relationship identified from the accessed wedding registry information, and wherein the relationship data record includes a second person identifier for a second person of the relationship, generate a first marriage prediction data record and store the first marriage prediction data record at a prediction database, wherein the first marriage prediction data record includes a relationship identifier of the relationship, a first marriage deadline, a first marriage outcome, and a first user identifier, determine whether the first marriage deadline of the first marriage prediction data record has passed, responsive to a determination that the first marriage deadline of the first marriage prediction data record has passed, access marriage records from a marriage records database system via the network and determine whether the first marriage outcome is correct based on the accessed marriage records, responsive to determining that the first marriage outcome is correct, provide a first notification to a system associated with the first user identifier, wherein the first notification indicates whether the first marriage outcome is correct, wherein the first marriage outcome indicates whether the first person and the second person are predicted to marry before the first marriage deadline, wherein the wedding registry database system is different from the marriage records database system, wherein the wedding registry information is different from the marriage records, wherein the wedding registry information includes names of people in a relationship about to become married, and wherein the first user identifier is associated with a third person that is different from the first person and the second person.

13. The system of claim 12, wherein system is constructed to determine that the first marriage outcome is correct by determining whether the first person and the second person of the relationship identified by the relationship identifier are included in the accessed marriage records and identified as being included in a marriage.

14. The system of claim 12, wherein responsive to receiving relationship information via the network, the system is constructed to generate relationship attributes and store the relationship attributes in the relationship data record.

15. The system of claim 12, wherein responsive to receiving first person information via the network, the system is constructed to generate first person attributes and store the first person attributes in association with the first person identifier.

16. The system of claim 12, wherein responsive to receiving second person information via the network, the system is constructed to generate second person attributes and store the second person attributes in association with the second person identifier.

17. The system of claim 12, wherein responsive to receiving relationship information via the network, the system is constructed to generate relationship attributes and store the relationship attributes in the relationship data record;

responsive to receiving first person information via the network, system is constructed to generate first person attributes and store the first person attributes in association with the first person identifier;

responsive to receiving second person information via the network, the system is constructed to generate second person attributes and store the second person attributes in association with the second person identifier; and the system is constructed to generate a first marriage probability index by performing an analysis of first person attributes, second person attributes, and relationship attributes, and store the first marriage probability index in the relationship data record.

18. The system of claim 17, wherein responsive to a user instruction, the system is constructed to provide a user interface for displaying information of the relationship data record.

19. The system of claim 18, wherein the system is constructed to provide information of the prediction database to an external system.

20. The system of claim 12, wherein the system is constructed to generate the first marriage prediction data record responsive to reception of first user selection of the relationship and reception of instructions for the first marriage deadline and the first marriage outcome via a user interface provided by the system.

* * * * *